(12) United States Patent
Moyer et al.

(10) Patent No.: US 7,873,819 B2
(45) Date of Patent: Jan. 18, 2011

(54) BRANCH TARGET BUFFER ADDRESSING IN A DATA PROCESSOR

(75) Inventors: William C. Moyer, Dripping Springs, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 371 days.

(21) Appl. No.: 11/969,116

(22) Filed: Jan. 3, 2008

(65) Prior Publication Data

US 2009/0177875 A1  Jul. 9, 2009

(51) Int. Cl.
G06F 9/40 (2006.01)
G06F 9/44 (2006.01)
(52) U.S. Cl. .................. 712/240; 712/238; 712/239
(58) Field of Classification Search ............... 712/238, 712/239, 240
See application file for complete search history.

(56) References Cited

U.S. PATENT DOCUMENTS

| | | | |
|---|---|---|---|
| 5,632,024 A | 5/1997 | Yajima et al. | |
| 5,826,074 A | 10/1998 | Blomgren | |
| 5,842,008 A * | 11/1998 | Gochman et al. | 712/240 |
| 5,987,599 A * | 11/1999 | Poplingher et al. | 712/238 |
| 6,088,793 A * | 7/2000 | Liu et al. | 712/239 |
| 6,216,213 B1 | 4/2001 | Breternitz, Jr. et al. | |
| 6,263,427 B1 * | 7/2001 | Cummins et al. | 712/236 |
| 6,343,354 B1 | 1/2002 | Breternitz, Jr. et al. | |
| 7,010,665 B1 | 3/2006 | Toll et al. | |
| 7,124,287 B2 | 10/2006 | Prasky et al. | |

* cited by examiner

*Primary Examiner*—Daniel Pan
(74) *Attorney, Agent, or Firm*—Robert L. King; Joanna G. Chiu; Kim-Marie Vo (57) ABSTRACT

A branch target buffer (BTB) receives, from a processor, a current fetch group address which corresponds to a current fetch group including a plurality of instructions. In response to the current fetch group address resulting in a group hit in the BTB, the BTB provides to the processor a branch target address corresponding to a branch instruction within the current fetch group which is indicated by a control field as valid and predicted taken. The BTB generates the branch target address using an unshared lower order target portion, corresponding to the branch instruction and located within the entry of the BTB which caused the group hit, and one of a shared higher order target portion located within the entry of the BTB which caused the group hit or a higher order portion of the current fetch group address based on a value of the control field.

5 Claims, 8 Drawing Sheets

BRANCH TARGET BUFFER ADDRESSING IN A DATA PROCESSOR

BACKGROUND

1. Field

This disclosure relates generally to data processors, and more specifically, to the execution of branch instructions by data processors.

2. Related Art

Various compression and decompression methods are known to reduce and reconstruct the size or bit length of data processing instructions and data operands such as addresses. The compression methods are implemented for the purpose of reducing the size of communication buses and memory storage required to store such instructions and operands. In one form, a common portion of higher order address bits are stored in a memory at a single storage location and shared with each of a plurality of low order address bits within a range defined for the high order bits. Pipeline stalls can occur when transitioning between differing high order bits.

Other compression methods include the compressing or shortening of software code. When the operands that are being compressed are address values, an available range of address values is significantly reduced. As a result, the ability of a data processing system to operate effectively is typically limited. With shorter address ranges, more operands are required to be retrieved from a main memory rather than a cache and system performance is thereby degraded.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
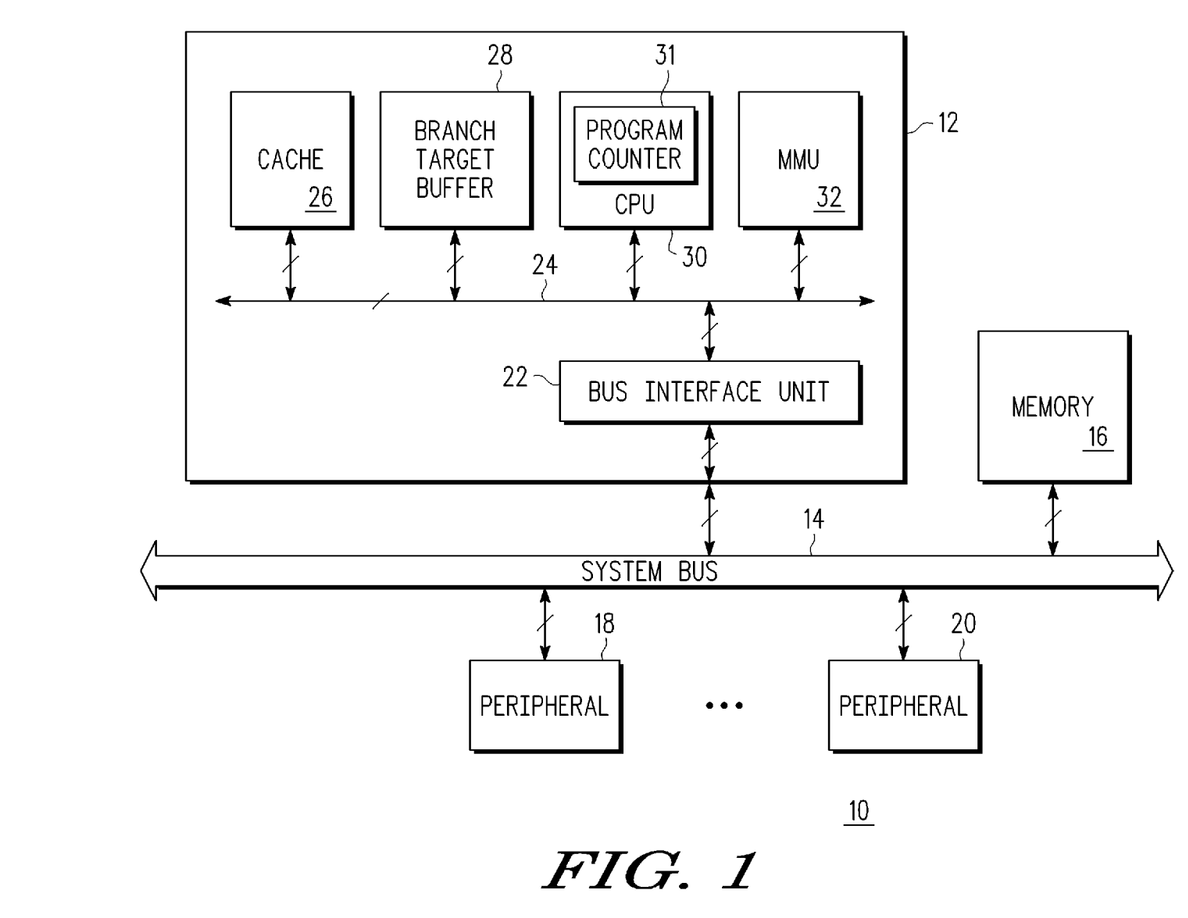
FIG. 1 illustrates in block diagram form a data processing system having a branch target buffer in accordance with one form of the present invention.

FIG. 1 illustrates, in block diagram form, a data processing system 10 in accordance with one embodiment of the present invention. Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. The memory 16 is a system memory that is coupled to the system bus 14 by a bidirectional conductor that, in one form, has multiple conductors. In the illustrated form each of peripherals 18 and 20 is coupled to the system bus 14 by bidirectional multiple conductors as is the processor 12. The processor 12 includes a bus interface unit 22 that is coupled to the system bus 14 via a bidirectional bus having multiple conductors. The bus interface unit 22 is coupled to an internal bus 24 via bidirectional conductors. The internal bus 24 is a multiple-conductor communication bus. Coupled to the internal bus 24 via respective bidirectional conductors is a cache 26, a branch target buffer (BTB) 28, a central processing unit (CPU) 30 and a memory management unit (MMU) 32. The CPU 30 is a processor for implementing data processing operations. Within the CPU 30 is a program counter 31 which is a storage device such as a register for holding a count value. Each of cache 26, BTB 28, CPU 30 and MMU 32 are coupled to the internal bus via a respective input/output (I/O) port or terminal.

In operation, the processor 12 functions to implement a variety of data processing functions by executing a plurality of data processing instructions. Cache 26 is a temporary data store for frequently-used information that is needed by the CPU 30. Information needed by the CPU 30 that is not within cache 26 is stored in memory 16. The MMU 32 controls interaction of information between the CPU 30 and the cache 26 and the memory 16. The bus interface unit 22 is only one of several interface units between the processor 12 and the system bus 14. The bus interface unit 22 functions to coordinate the flow of information related to instruction execution including branch instruction execution by the CPU 30. Control information and data resulting from the execution of a branch instruction are exchanged between the CPU 30 and the system bus 14 via the bus interface unit 22. The BTB 28 is a buffer for storing a plurality of entries. Each of the entries corresponds to a fetch group of branch target addresses associated with branch instructions that are executed by the CPU 30. Therefore, CPU 30 selectively generates fetch group addresses which are sent via the internal bus 24 to the BTB 28. The BTB 28 contains a subset of all of the possible fetch group addresses that may be generated by CPU 30. In response to receiving a fetch group address from CPU 30, the BTB 28 provides a branch target address to the CPU 30 that corresponds to a branch instruction within a plurality of instructions. The branch target address which the BTB 28 provides is both a valid address and may be predicted to be taken as will be described below.

Figure 2:
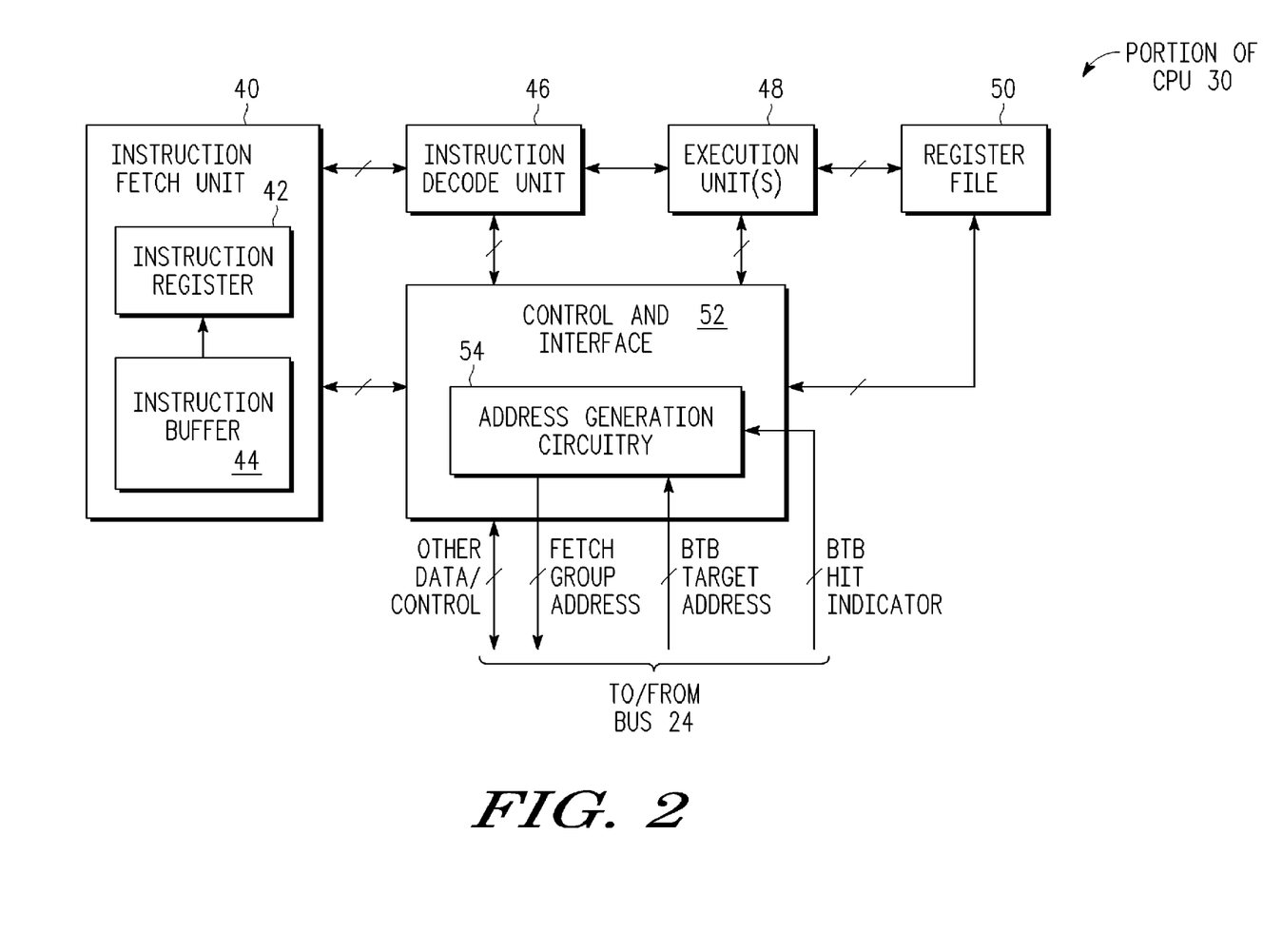
FIG. 2 illustrates in block diagram form a portion of a central processing unit (CPU) of the data processing system of FIG. 1 in accordance with one form of the present invention.

Illustrated in FIG. 2 is a detailed portion of the CPU 30 of FIG. 1 that relates to the execution of instructions and the use of the branch target buffer 28. An instruction fetch unit 40 is illustrated as including both an instruction buffer 44 and an instruction register 42. The instruction buffer 44 has an output that is connected to an input of the instruction register 42. A multiple conductor bidirectional bus couples a first output of the instruction fetch unit 40 to an input of an instruction decode unit 46 for decoding fetched instructions. An output of the instruction decode unit 46 is coupled via a multiple conductor bidirectional bus to one or more execution unit(s) 48. The one or more execution unit(s) 48 is coupled to a register file 50 via a multiple conductor bidirectional bus. Additionally, each of the instruction fetch unit 40, the instruction decode unit 46, the one or more execution unit(s) 48 and the register file 50 is coupled via separate bidirectional buses to respective input/output terminals of a control and interface unit 52 that interfaces to and from the internal bus 24. The control and interface unit 52 has address generation circuitry 54 having a first input for receiving a BTB Hit Indicator signal via a multiple conductor bus from the branch target buffer 28 via the internal bus 24. The address generation circuitry 54 also has a second input for receiving a BTB Target Address via a multiple conductor bus from the MMU 32 via the internal bus 24. The address generation circuitry 54 has a multiple conductor output for providing a Fetch Group Address signal to the branch target buffer 28 via the internal bus 24. Other data and control signals are communicated via multiple conductors between the control and interface unit 52 and the internal bus 24 for implementing data processing instruction execution.

In the illustrated form of this portion of CPU 30, the control and interface unit 52 controls the instruction fetch unit 40 to selectively identify and implement the fetching of instructions including the fetching of groups of instructions. The instruction decode unit 46 performs instruction decoding for the one or more execution unit(s) 48. The register file 50 is used to support the one or more execution unit(s) 48. Within the control and interface unit 52 is address generation circuitry 54. The address generation circuitry 54 sends out a fetch group address to the BTB 28 to obtain multiple instructions. In response to the fetch group address a BTB target address is provided to the CPU 30 to identify an address of a group of instructions. The BTB target address is used by CPU 30 to obtain an operand at the target address from either cache 26 or from memory 16 if the address is not present and valid within cache 26.

Figure 3:
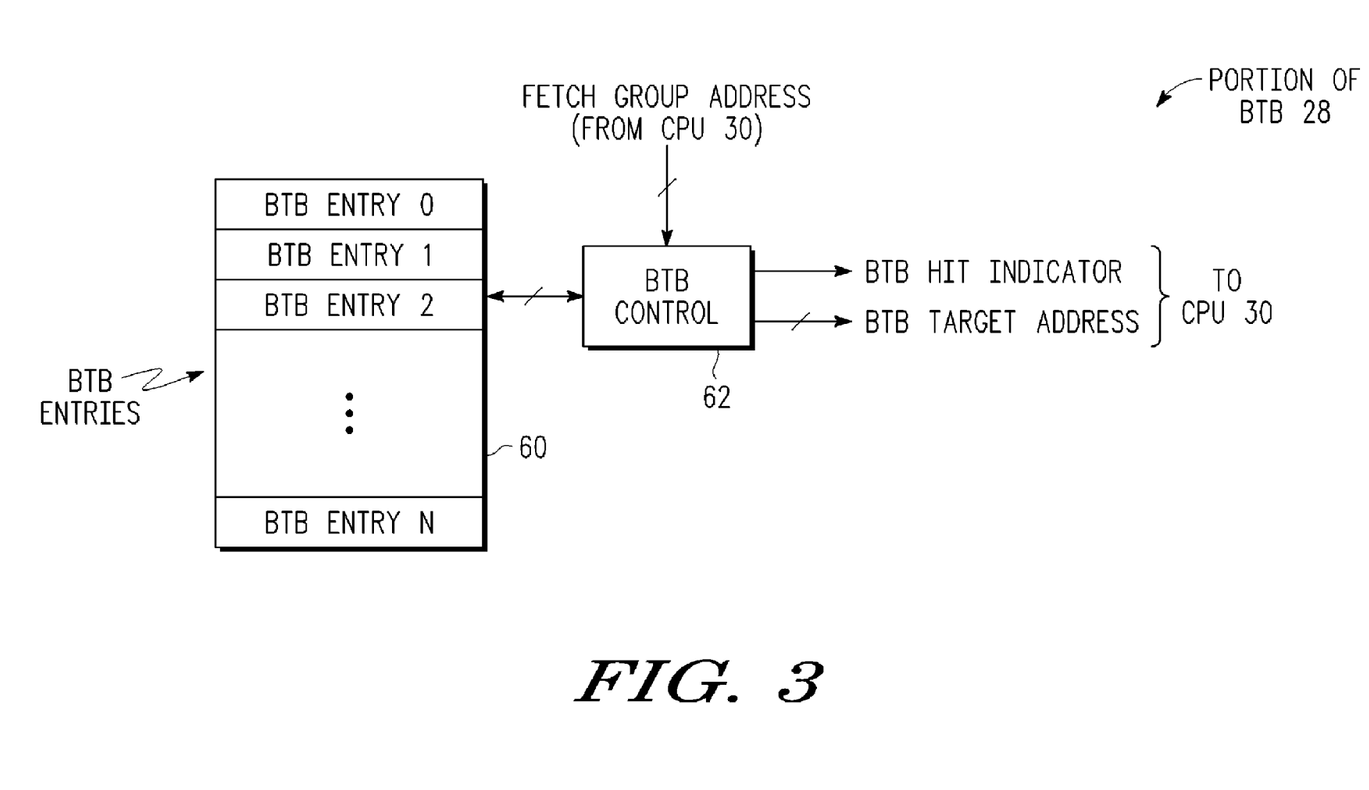
FIG. 3 illustrates in block diagram form a portion of the branch target buffer of FIG. 1 in accordance with one form of the present invention.

Illustrated in FIG. 3 is further detail of a portion of the BTB 28. A register 60 stores (N+1) BTB entries where N is an integer. The register 60 has an input/output terminal coupled to an input/output terminal of a BTB control circuit 62 via a bidirectional multiple conductor bus. The BTB control circuit 62 also has an input for receiving the Fetch Group Address from the CPU 30. A first output of the BTB control circuit 62 provides the BTB Hit Indicator signal to the CPU 30 via the bus 24. A second output of the BTB control circuit 62 provides the BTB Target Address to the CPU 30.

In operation, a Fetch Group Address is received from the CPU 30. The BTB control circuit 62 uses the Fetch Group Address and determines whether the requested Fetch Group Address exists in the register 60. If so, the BTB Hit Indicator signal is asserted. If not, the BTB Hit Indicator is not asserted and the CPU 30 determines that the MMU 32 needs to provide the BTB Target Address associated with the Fetch Group Address. The missing entry is typically provided from the memory 16. In addition to asserting the BTB Hit Indicator signal, the BTB control circuit 62 retrieves the requested BTB Target Address from the correct entry and outputs that address to the CPU 30.

Figure 4:
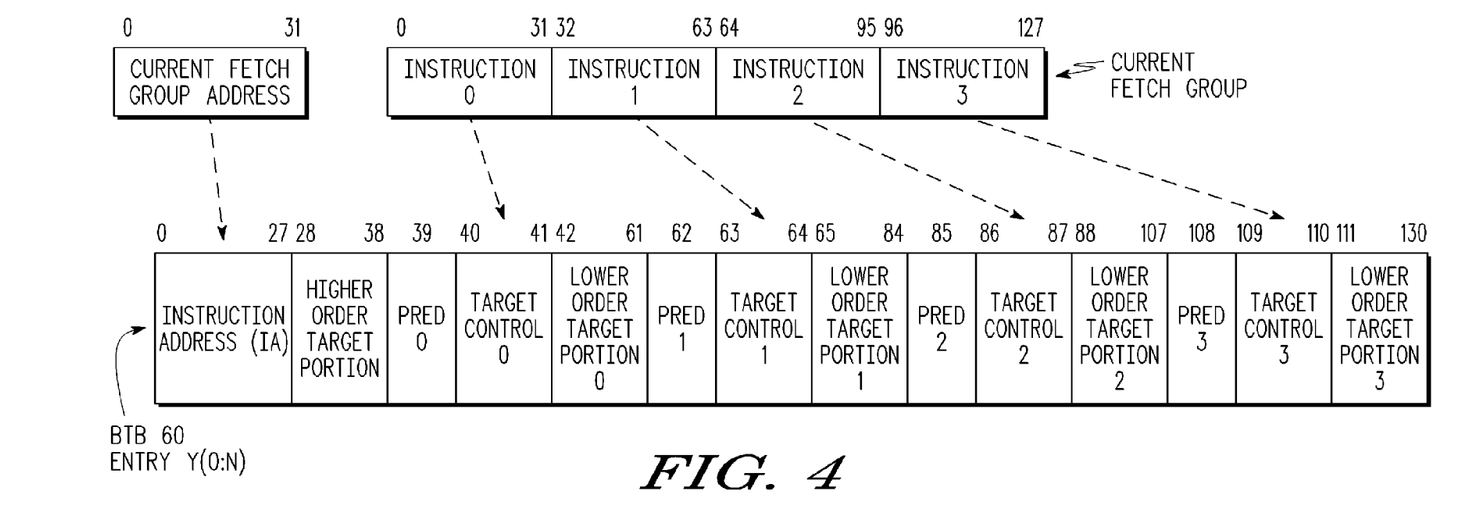
FIG. 4 illustrates in diagrammatic form a first embodiment of an entry in the branch target buffer of FIG. 1 corresponding to a group of fetched data processing instructions in accordance with the present invention.

Illustrated in FIG. 4 is a first embodiment of a BTB entry designated Y(0:N) in the register 60 of FIG. 3. In the illustrated form the entry has (N+1) bits arbitrarily implemented as one hundred thirty-one bits. It should be appreciated that any number of total bits may be chosen for an entry. In a first field of the entry that encompasses bits 0 through 27, an Instruction Address (IA) field is provided. This field contains a predetermined number of bits related to what fetch group of addresses that the entry is correlated to. The BTB control circuit 62 compares the IA with a subset of a thirty-two bit current fetch group address provided by the CPU 30 to determine whether the entry contains the fetch instruction group that is being addressed. If there is a match, the BTB control circuit 62 then functions to determine if there are any valid branch target addresses within the target address grouping and whether any of such valid branch target addresses are predicted to be taken. If so, then the BTB control circuit 62 asserts the BTB Hit Indicator signal. If not, the BTB Hit Indicator signal is not asserted. When an Instruction Address matches a current fetch group address provided by CPU 30, the BTB control circuit 62 analyzes each of a plurality of Target Control bits associated with the fetch group address to determine which branch instructions within the group are valid.

In the embodiment illustrated in FIG. 4, a fetch group has four thirty-two bit instructions (Instruction 0 through 3), which are fetched as a group of instructions by instruction fetch circuitry contained within control and interface circuitry 52 of FIG. 2. Each fetch group corresponds to at most one entry within the register 60 of FIG. 3. Within a fetch group, there may be zero to four branch instructions, depending on the instruction types of each instruction corresponding to Instruction 0 to 3 of the current fetch group. If a given one of the instructions within a fetch group is a branch instruction, then the target control field for that instruction within the BTB entry Y may be set to indicate a valid branch. If a given instruction within a fetch group is not a branch instruction, then the target control field corresponding to that instruction within the BTB entry will not be set to indicate a valid branch. In one embodiment, a target control field is not necessarily set to indicate a valid branch for a branch instruction until the branch has been executed and determined to be a taken branch. Thus, in this embodiment, individual target control fields may be updated at different points in time within a given BTB entry Y.

Figure 5:
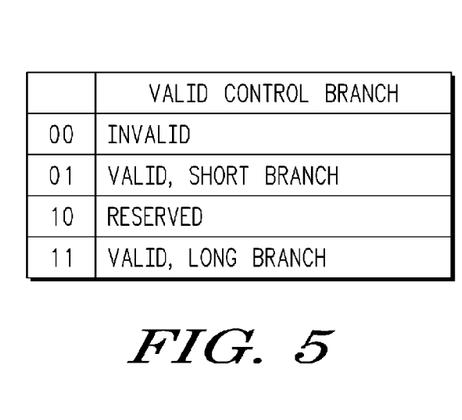
FIG. 5 illustrates a table of the encoding of the target control fields in the branch target buffer entry of FIG. 4 in accordance with the present invention.

Illustrated in FIG. 5 is an encoding of Target Control fields within the BTB entries. In one form a two-bit encoding is used to indicate whether a branch instruction is valid or not. These two bits are implemented in the Target Control fields of FIG. 4 at bit positions 40-41, 63-64, 86-87 and 109-110. These four Target Control fields respectively correlate as valid bits for Instruction 0, Instruction 1, Instruction 2 and Instruction 3 which are in the current fetch group that has been addressed. When the Target Control value is 00, the branch instruction is invalid. When the Target Control value is 01, the branch target address is valid and is a short branch. Short branches are characterized as being close in distance to the current fetch group address, i.e. the offset from the current fetch group address is within a predetermined distance. For short branches, the branch target address is formed by using an unshared lower order target portion field associated with that Target Control field and a higher order portion of the current fetch group address provided by CPU 30. However, in one embodiment, a branch target address is not formed even though the lower order target portion is indicated as being valid unless a respective branch prediction bit also indicates that the branch is predicted to be taken. The branch prediction bits are in the single-bit fields that are respectively at bits 39, 62, 85 and 108 for instructions 0, 1, 2 and 3. In an alternate embodiment, the target address may be formed, but may remain unused if the branch is predicted to be 'not taken'. In one embodiment, a short branch uses the same value as the current fetch group address to form the high-order eleven bits of a branch target address, and uses the respective lower order target portion field to supply the next most significant nineteen address bits. The lower two bits of the target address may be set to "00". Alternate embodiments may utilize different field widths for the lower order target portion, and thus may utilize a different portion of the current fetch group address to form the high order bits of a branch target address. The target control branch value of 10 is reserved in the FIG. 5 implementation. The valid control branch value of 11 indicates that the branch target address is valid and is a long branch. Long branches are characterized as being farther in distance to the current fetch group address than short branches, i.e. the offset from the current fetch group address exceeds a predetermined distance. For long branches, the branch target address is formed by using the shared higher order target portion field (bits 28 through 38) and an unshared lower order target portion field associated with that Target Control field to form a next portion of the branch target address. In one embodiment, a long branch uses the shared higher order target portion field of the BTB entry to form the high-order eleven bits of a branch target address, and uses the respective lower order target portion field to supply the next most significant nineteen target address bits. The lower two bits of the target address may be set to "00". Alternate embodiments may utilize different field widths for the higher order and lower order target portions. Thus from FIGS. 4 and 5 it should be apparent that each entry has a shared higher order target portion and multiple unshared lower order target portions. Each lower order target portion is qualified by its own target control field and branch prediction bit to indicate whether the branch is predicted to be taken. With the illustrated BTB entry format, an efficient compression of multiple target addresses is provided since a full target address is not stored for each of the four possible branch instructions within the fetch group.

When multiple lower order target portions are indicated as being valid, the BTB control circuit 62 selects a single branch target address to provide based upon a predetermined priority. For example, in one form the first branch target address in a BTB entry that is determined to be valid and predicted taken is the branch target address that is provided. The determination may be made either from left-to-right or vice versa in the BTB entry. In other forms an assigned rank ordering among instructions may be assigned to select one branch target address from among multiple branch target addresses. It should be understood that numerous types of prioritization may be used to select one of multiple valid and predicted taken branch instructions.

Figure 6:
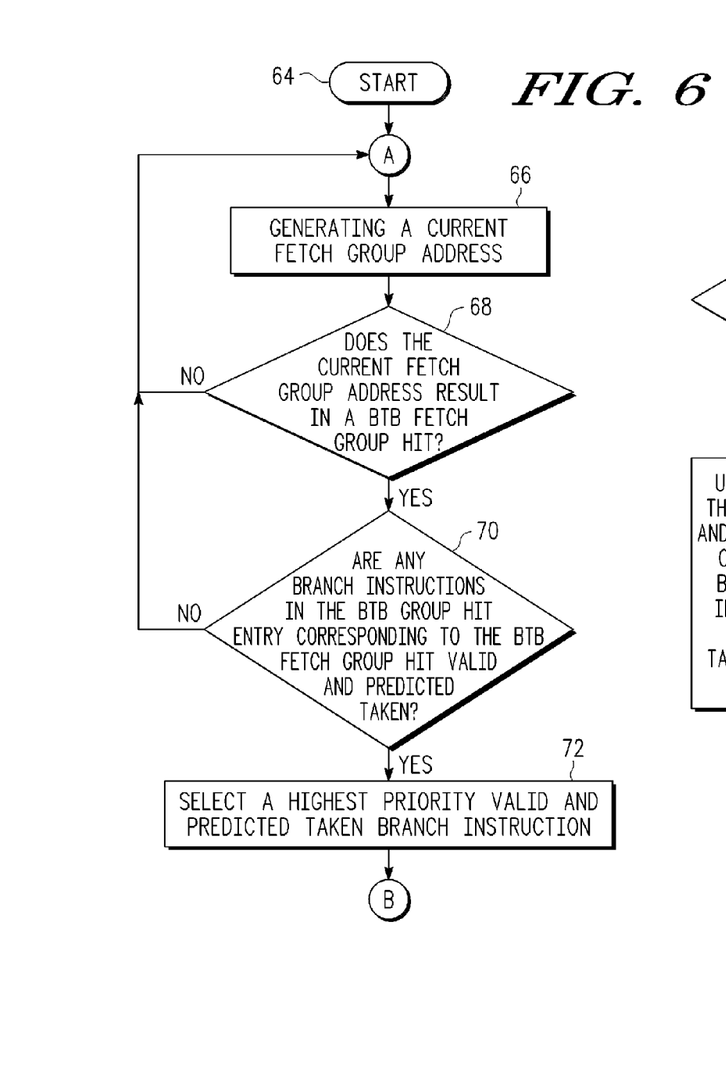
FIG. 6 illustrates a flow chart of a portion of a method to generate a branch target address having compression in accordance with the present invention.
Figure 7:
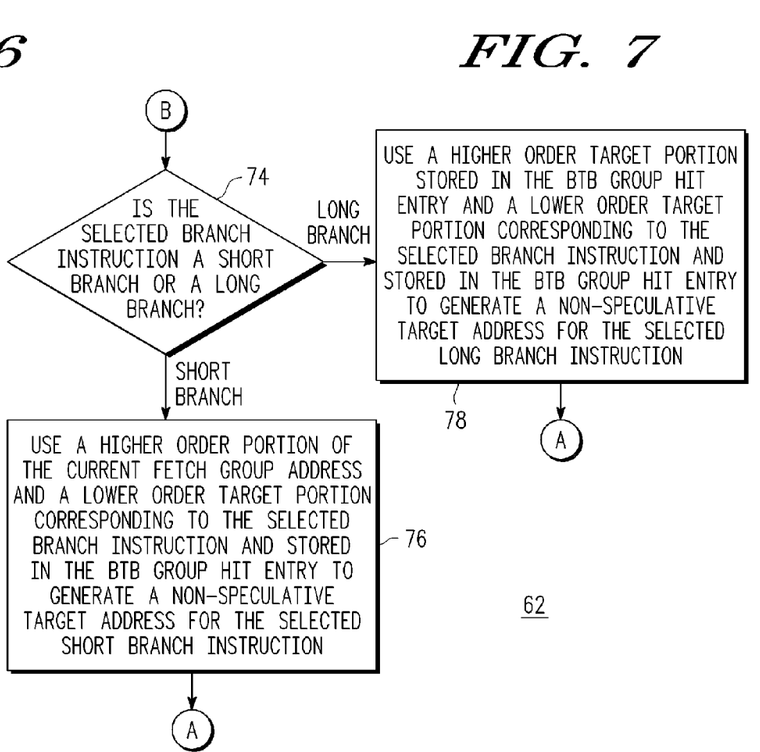
FIG. 7 illustrates a flow chart of a remaining portion of one form of the method of FIG. 6.

Illustrated in FIGS. 6 and 7 are flow charts which illustrate a method for efficient compression in the BTB 28. After a start step 64, a current fetch group address is generated in a step 66. In a step 68 a determination is made by the BTB control circuit 62 as to whether the current fetch group address results in or creates a BTB fetch group hit. If there is no hit then the process returns to the beginning to await receipt of another fetch group address. If however there is a hit, a step 70 is performed to determine whether there are any valid and predicted taken branch instructions in the BTB group hit entry that correspond to the BTB fetch group hit. If there are none that are valid and predicted taken then the process returns to the beginning to await receipt of another fetch group address. If there is at least one valid and predicted taken branch instruction in the BTB group hit entry, then a step 72 is performed. In step 72 a highest priority valid and predicted taken branch instruction is selected.

Illustrated in FIG. 7 is a step 74 that continues from step 72. A determination is made in step 74 as to whether the selected branch instruction is a short branch or a long branch. The determination is made as described above based upon the encoding of the target control bits which determine a valid control branch. If the selected branch instruction is a short branch, a step 76 is implemented by the BTB control circuit 62. A higher order portion of the current fetch group address is used in combination with a lower order target portion corresponding to the selected branch instruction that is stored in the BTB group hit entry. The combination of these two portions generates a non-speculative target address for the selected short branch instruction.

If the selected branch instruction is a long branch, a step 78 is implemented by the BTB control circuit 62. The higher order target portion stored as bits 28 through 38 of FIG. 4 in the BTB group hit entry is used in combination with a lower order target portion corresponding to the selected branch instruction and stored in the BTB group hit entry. The combination of these two portions generates a non-speculative target address for the selected long branch instruction. As will be subsequently described, target addresses resulting from a valid BTB hit are non-speculative.

Figure 8:
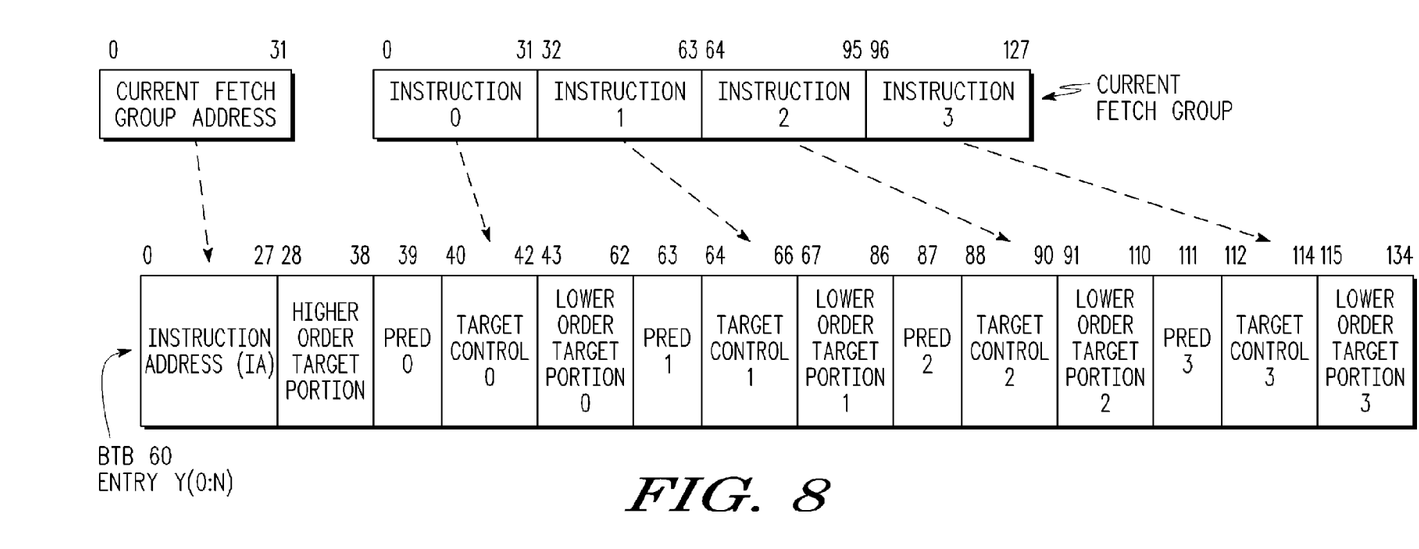
FIG. 8 illustrates in diagrammatic form a second embodiment of an entry in the branch target buffer of FIG. 1 corresponding to a group of fetched data processing instructions.

Illustrated in FIG. 8 is another form of a BTB entry Y(0:N) that is one of many entries in the register 60. In this form the BTB entry is implemented with one hundred thirty-five bits (N is 134). However, it should be understood that various bit lengths may be used for each field in the BTB entry. In a left-most field is an Instruction Address (IA) field. The IA field is used by the BTB control circuit 62 to match with a portion of a current fetch group address that is provided by the CPU 30. While the IA field has fewer bits in this implementation than the current fetch group address, an accurate hit determination is performed. Within the illustrated entry of register 60 are address and control bits associated with a group of potential branch instructions designated as Instruction 0, Instruction 1, Instruction 2 and Instruction 3. It should be apparent that the IA field can be implemented having various bit sizes. An adjacent field is a shared or common field containing a higher order target portion of a branch target address. The remaining fields of the illustrated BTB entry of register 60 that are to the right should be viewed in groups of three and respectively are correlated to four instructions. Bits 39 through 62 correspond to Instruction 0 wherein bit 39 is a predicted taken branch bit, bits 40 through 42 are target control bits, and bits 43 through 62 are lower order bits for the branch target address corresponding to Instruction 0. Similarly, bits 63 through 86 correspond to Instruction 1 wherein bit 63 is a predicted taken branch bit, bits 64 through 66 are target control bits, and bits 67 through 86 are lower order bits for the branch target address corresponding to Instruction 1. Similarly, bits 87 through 110 correspond to Instruction 2 wherein bit 87 is a predicted taken branch bit, bits 88 through 90 are target control bits, and bits 91 through 110 are lower order bits for the branch target address corresponding to Instruction 2. Finally, bits 111 through 134 correspond to Instruction 3 wherein bit 111 is a predicted branch bit, bits 112 through 114 are target control bits, and bits 115 through 134 are lower order bits for the branch target address corresponding to Instruction 0.

Figure 9:
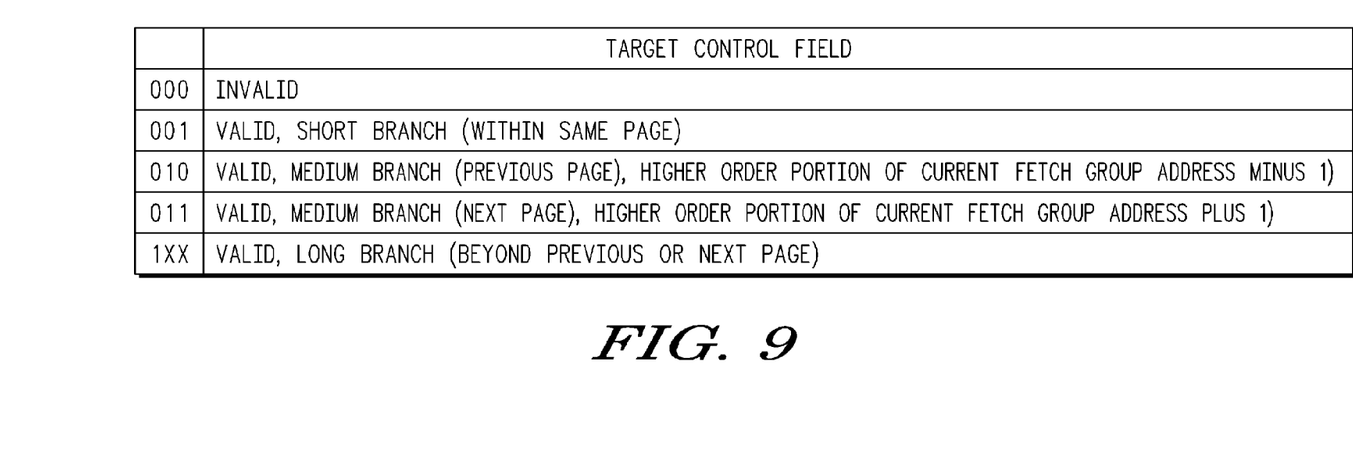
FIG. 9 illustrates a table of the encoding of the target control fields in the branch target buffer entry of FIG. 8 in accordance with the present invention.

Illustrated in FIG. 9 is an encoding table for the three-bit Target Control fields for instructions 0 through 3 of FIG. 8. When the Target Control value is 000 the following Lower Order Target Portion is invalid. When the Target Control value is 001, the following Lower Order Target Portion is valid and the branch for the instruction is a short branch meaning that the branch is to an address within the same page as the current instruction fetch group address. In one embodiment, the page of the current fetch group address is defined by the values of bits 0:10 of the current fetch group address. Alternate embodiments may use a different set of bits to define the current page. A medium branch is to an address located at either the previous memory page or the next memory page relative to the page of the current address. A long branch is to an address located beyond either the previous or the next page of memory. When the Target Control value is 010, the Target Control value is valid and the branch for the instruction is a medium branch that is to an address of the previous memory page. When the Target Control value is 011, the Target Control value is valid and the branch for the instruction is a medium branch that is to an address of the next memory page. When the Target Control value is 1XX, the Target Control value is valid and the branch for the instruction is a long branch. The branch is a long branch regardless of the binary value for the bits other than the MSB as is indicated by the "X" designation. Since many branches may be to a small offset from the current page or within the current page, the embodiment shown in FIGS. 8 and 9 provides an efficient means to compress multiple branch target addresses resulting from multiple branch instructions within the same instruction fetch group. Many combinations of short, medium, and long branches may be present in a single instruction fetch group, and still be capable of generating branch target addresses using the compression scheme of FIGS. 8 and 9. Therefore, with a small instruction field for each instruction within the fetch group, the Target Control fields provide a controller with information regarding the destination of the branch associated with that instruction.

Figure 10:
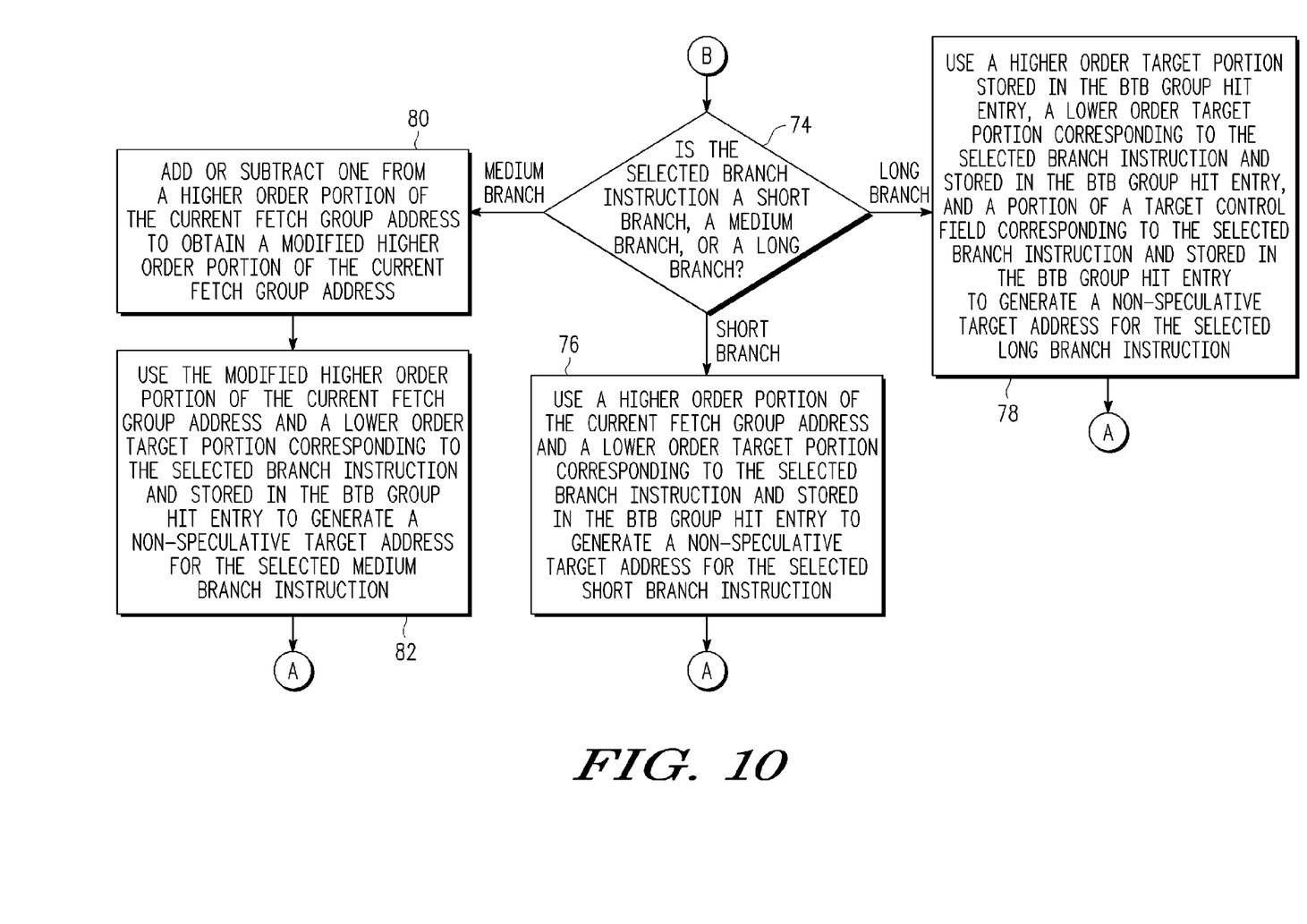
FIG. 10 illustrates a flow chart of a method to generate a branch target address having compression in accordance with another form of the present invention.

Illustrated in FIG. 10 is a flowchart of a method associated with the generation of a branch instruction address using the alternative BTB entry format of FIG. 8. For convenience of illustration, the method illustrated in FIG. 10 avoids significant repetition with the method illustrated in FIG. 6. The first step illustrated in FIG. 10 is at point B. However, prior to that step, steps 64, 66, 68, 70 and 72 of FIG. 6 are performed. Once steps 64, 66, 68, 70 and 72 of FIG. 6 have been implemented the point B is reached and the method continues as illustrated in FIG. 10. In a step 74 a decision is made whether the selected branch instruction is a short branch, medium branch or a long branch based upon the value of the Target Control field. If the selected branch instruction is a short branch, a step 76 is performed wherein a higher order portion of the current fetch group address is used with a lower order target portion corresponding to the selected branch instruction and stored in the BTB group hit entry to generate a non-speculative target address for the selected short branch instruction. Upon completion of step 76 the method returns to point A for repetition with a new current fetch group address being generated in step 66 of FIG. 6.

If the selected branch instruction is a medium branch, a step 80 is performed wherein the value of one is either added or subtracted from a higher order portion of the current fetch group address to obtain a modified higher order portion of the current fetch group address. Whether one is added or subtracted depends upon the type of medium branch which exists as controlled by the encoding of the Target Control field. In a following step 82 the modified higher order portion of the current fetch group address and a lower order target portion corresponding to the selected branch instruction and stored in the BTB group hit entry are used to generate a non-speculative target address for the selected medium branch instruction. Upon completion of step 82 the method returns to point A for repetition with a new current fetch group address being generated in step 66 of FIG. 6.

If the selected branch instruction is a long branch, a step 78 is performed wherein a higher order target portion stored in the BTB group hit entry (bits 28 to 38 in FIG. 8) is used with both a lower order target portion corresponding to the selected branch instruction and stored in the BTB group hit entry and a portion of a target control field corresponding to the selected branch instruction and stored in the BTB group hit entry. These three portions are combined to generate a non-speculative target address for the selected long branch instruction. Upon completion of step 78, the method returns to point A for repetition with a new current fetch group address being generated in step 66 of FIG. 6. Note that for the Target Control encoding illustrated in FIG. 9 for a long branch, the two low order bits of the three-bit target control field are not used to indicate the type of branch is a long branch (1XX) and thus in one embodiment, may be used to extend the range of the branch by serving as additional target address bits having values of 00, 01, 10 or 11. In an alternate embodiment, instead of being used to extend the range of the branch, the use of these bits may allow for either a smaller higher order target portion specifier, or a smaller lower order target portion specifier. Thus the additional bits of the Target Control field of the FIG. 8 entry in the branch target buffer enables additional branching capability.

Figure 11:
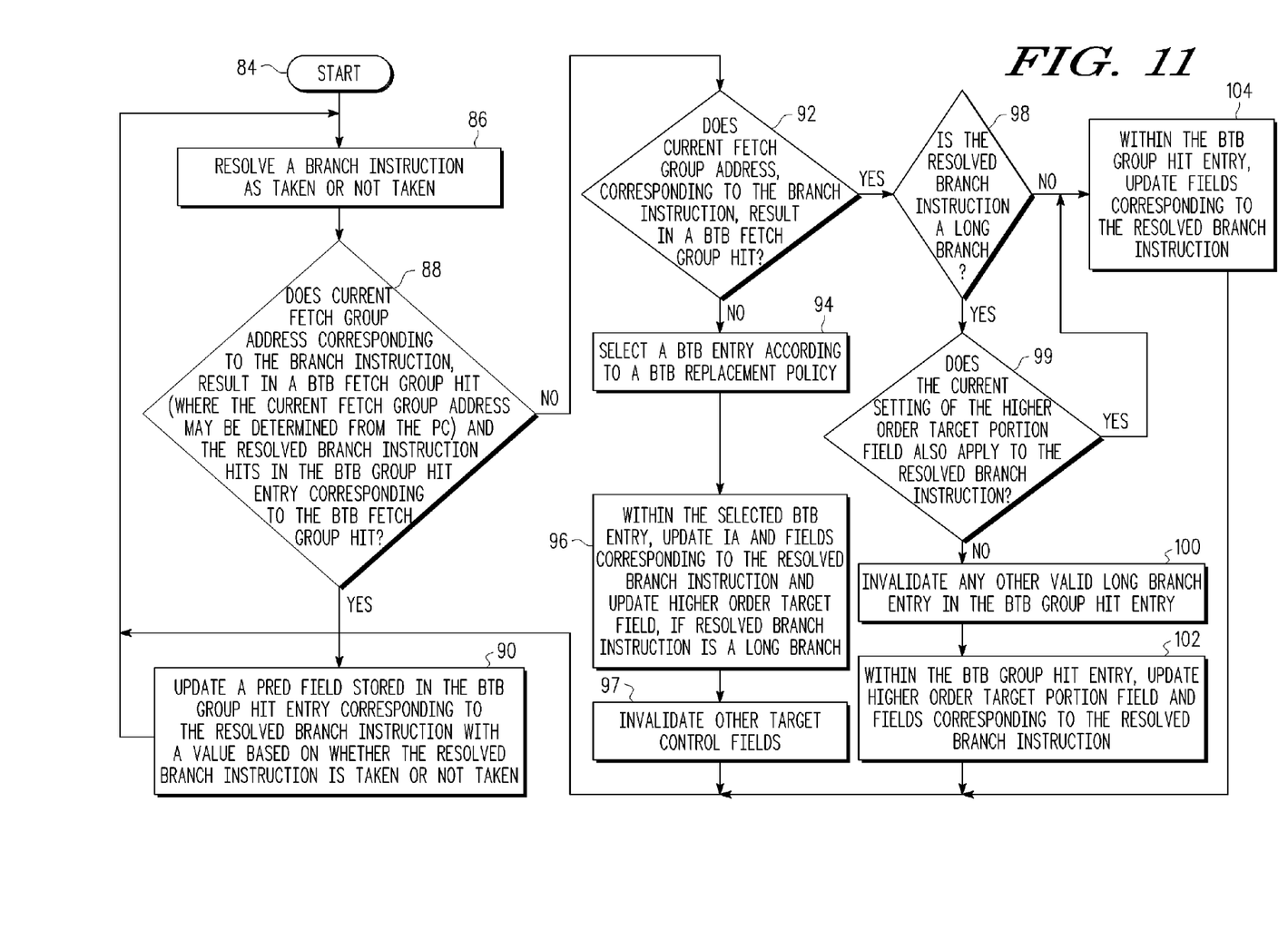
FIG. 11 illustrates a flow chart of one form of a method of branch target buffer (BTB) allocation of field entries in response to execution of a branch instruction.

Illustrated in FIG. 11 is a flowchart of a method of branch target buffer (BTB) updating of field entries in response to execution of a branch instruction. After a start step 84 of identifying a branch instruction, the branch instruction is resolved as being taken or not taken in a step 86. In a step 88 a decision is made to determine whether a current fetch group address corresponding to the branch instruction causes a BTB fetch group hit. The current fetch group address in one form is determined from a program counter (PC). A decision is also made whether the resolved branch instruction hits in the BTB group hit entry corresponding to the BTB fetch group hit, i.e. whether the target control encoding corresponding to the branch indicates that the branch is also a valid branch in the BTB entry, and thus ensures that the stored target portion specifier(s) corresponding to the branch instruction within the instruction fetch group are accurate (i.e. non-speculative). If both hits exist, a step 90 is performed wherein a prediction (Pred) field that is stored in the BTB group hit entry corresponding to the resolved branch instruction is updated with a value based upon whether the resolved branch instruction is taken or not taken. Upon completion of step 90 the method returns to the start step 84 and a different branch instruction is resolved as taken or not taken. If the branch is to be taken step 88 and others are repeated. If both hits do not exist in step 88 then a step 92 is implemented. A decision is made whether the current fetch group address that corresponds to the branch instruction results in a BTB fetch group hit. If there is no hit, a step 94 is performed wherein a BTB entry is selected according to a BTB replacement policy. In a step 96 within the selected BTB entry, the IA field is updated with a high-order portion of the fetch group address corresponding to the branch instruction, in addition to the proper low order target address portion field and target control field corresponding to the resolved branch instruction. The higher order target field is also updated if the resolved branch instruction is a long branch. In a following step 97 the other target control fields are invalidated. The processing then returns to the beginning of step 86 to repeat the method with a subsequent branch instruction. The process of invalidating the remaining target control fields of the BTB entry in step 97 after the replacement operation in step 96 ensures that no non-deterministic branch target addresses are subsequently generated. Without the invalidation, a non-deterministic (i.e. a speculative) target address could be generated as a consequence of stale information remaining in one or more target control and lower order target address portion fields due to a previous allocation for one or more unrelated branch instructions from a different instruction fetch group. Eliminating such speculative target addresses from being generated results in a more efficient utilization of resources, since wasted fetching of incorrect branch target addresses is avoided. This avoids impacting performance (unnecessary memory accesses which will be discarded) as well as minimizing wasted power consumption.

If there is a BTB fetch group hit in step 92, a step 98 is performed. A decision is made in step 98 to determine whether the resolved branch instruction is a long branch. If the resolved branch instruction is a long branch, a step 99 is performed. A decision is made in step 99 to determine whether the current setting of the higher order target portion field of the BTB entry already corresponds to the resolved long branch. This step of determining is performed to allow for multiple long branches within the same fetch group which share a common setting of the high order target portion to be valid concurrently. If the current setting does not correspond to the resolved long branch, a step 100 is performed wherein any other valid long branch entry in the BTB group hit entry is invalidated. The process of invalidating the remaining target control fields of the BTB entry in step 100 ensures that no non-deterministic branch target addresses are subsequently generated following the performing of step 102. In a following step 102, the higher order target portion field within the BTB group hit entry is updated in addition to fields corresponding to the resolved branch instruction. The processing then returns to the beginning of step 86 to repeat the method with a subsequent branch instruction.

If the resolved branch instruction is determined in step 98 to not be a long branch, or if the result of determining in step 99 indicates that the current setting of the high order target portion field already does correspond to the resolved long branch, a step 104 is performed. Within the BTB Group Hit entry, fields corresponding to the resolved branch instruction are updated. Upon the update, the processing then returns to the beginning of step 86 to repeat the method with a subsequent branch instruction.

By now it should be appreciated that there has been provided efficient branch target buffer (BTB) addressing in a data processing system. A limited number of higher order address bits are associated with each entry in the BTB corresponding to a fetch group. Each potential branch within the fetch group has independent lower order target address bits and share a common group of higher order target address bits. For each potential branch within the fetch group, a valid flag indicates whether the branch entry is valid. A control flag determines whether the branch target high order bits for a particular branch are: (a) the same as the current fetch group address; (b) less by one; (c) greater by one; or (d) an extended upper address field. In an alternate form the control flag is implemented as a single bit and less functionality is provided. When a second branch in the fetch group is taken and the branch target is not within the range of the current branch, if the higher order target bits stored within the BTB entry need to change, all other fetch group entries using the extension field are marked as not valid. Branch entries within the fetch group that do not require the extended target remain valid. Therefore, maximum utilization of the BTB entry is achieved while guaranteeing that a branch target fetch address is never speculative, simplifying recovery logic and minimizing power. No secondary BTB lookup structures are required.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 16 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of bits used in the address fields may be modified based upon system requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Therefore, there has herein been provided a data processing system having a processor for generating fetch group addresses and for receiving multiple instructions in response to each fetch group address. A branch target buffer (BTB) is coupled to the processor, the BTB having a plurality of entries, each entry corresponding to a fetch group and comprising a shared higher order target portion, a plurality of unshared lower order target portions, and a plurality of control fields. Each of the plurality of control fields corresponds to one of the plurality of unshared lower order target portions. The BTB receives a current fetch group address from the processor. The current fetch group address corresponds to a current fetch group having a plurality of instructions. In response to the current fetch group address resulting in a group hit in the BTB, the BTB provides to the processor a branch target address corresponding to a branch instruction within the plurality of instructions of the current fetch group which is indicated by a control field as valid. The control field corresponds to the branch instruction and is located within an entry of the BTB which caused the group hit. The BTB generates the branch target address using an unshared lower order target portion, corresponding to the branch instruction and located within the entry of the BTB which caused the group hit, and one of a shared higher order target portion located within the entry of the BTB which caused the group hit or a higher order portion of the current fetch group address based on a value of the control field. In one form when the value of the control field indicates the branch instruction is a short branch, the BTB generates the branch target address using the unshared lower order target portion, corresponding to the branch instruction and located within the entry of the BTB which caused the group hit, and the higher order portion of the current fetch group address. In another form a target of the short branch is located on a same memory page that is addressed by the current fetch group address. In yet another form when the value of the control field indicates the branch instruction is a long branch, the BTB generates the branch target address using the unshared lower order target portion, corresponding to the branch instruction and located within the entry of the BTB which caused the group hit, and the shared higher order target portion located within the entry of the BTB which caused the hit. In one form a target of the long branch is located on a different memory page than a current memory page addressed by the current fetch group address. In another form when the value of the control field indicates the branch instruction is a long branch, the BTB further uses at least a portion of the control field as a portion of the branch target address. In another form a target of the long branch is located at least two memory pages away from a current memory page addressed by the current fetch group address. In another form when the value of the control field indicates the branch instruction is a medium branch whose target is located on a memory page that is located either immediately subsequent to or immediately prior to a current memory page addressed by the current fetch group address, the BTB generates the branch target address using the unshared lower order target portion, corresponding to the branch instruction and located within the entry of the BTB which caused the group hit, and the higher order portion of the current fetch group address, wherein the BTB modifies the higher order portion of the current fetch group address when generating the branch target address. In one form when generating the branch target address, the BTB modifies the higher order portion of the current fetch group address by adding or subtracting a predetermined value to or from the higher order portion of the current fetch group address.

In another form there is provided a data processing system having a processor for generating fetch group addresses and for receiving multiple instructions in response to each fetch group address. A branch target buffer (BTB) is coupled to the processor and has a plurality of entries, each entry corresponding to a fetch group. Each entry has a shared higher order target portion, a plurality of unshared lower order target portions, and a plurality of control fields. Each of the plurality of control fields corresponds to one of the plurality of unshared lower order target portions. The BTB receives a current fetch group address from the processor, the current fetch group address corresponding to a current fetch group having a plurality of instructions. In response to the current fetch group address resulting in a group hit in the BTB, the BTB provides to the processor a branch target address corresponding to a branch instruction within the plurality of instructions of the current fetch group which is indicated by a control field as valid, the control field corresponding to the branch instruction and located within an entry of the BTB which caused the group hit. When the control field further indicates that the branch instruction is a long branch instruction, the BTB generates the branch target address using at least a portion of the control field as a portion of the branch target address. In one form when the control field further indicates that the branch instruction is a long branch instruction, the BTB generates the branch target address further using an unshared lower order target portion, corresponding to the branch instruction and located within the entry of the BTB which caused the group hit, and a higher order portion of the current fetch group address. In another form the long branch instruction has a target that is located at least two memory pages away from a current memory page addressed by the current fetch group address. In yet another form when the control field further indicates that the branch instruction is a medium branch instruction whose target is located on a memory page that is located either immediately subsequent to or immediately prior to a current memory page addressed by the current fetch group address, the BTB generates the branch target address by adding or subtracting a predetermined value to or from a higher order portion of the current fetch group address to obtain a result and combines the result with an unshared lower order target portion, corresponding to the medium branch instruction and located within the entry of the BTB which caused the group hit. In another form when the control field further indicates that the branch instruction is a short branch instruction whose target is located on a same memory page that is addressed by the current fetch group address, the BTB generates the branch target address using the unshared lower order target portion, corresponding to the short branch instruction and located within the entry of the BTB which caused the group hit, and a higher order portion of the current fetch group address.

In another form there is provided a method of providing a processor for generating fetch group addresses and for receiving multiple instructions in response to each fetch group address. A branch target buffer (BTB) is coupled to the processor, the BTB having a plurality of entries, each entry corresponding to a fetch group and comprising a shared higher order target portion, a plurality of unshared lower order target portions, and a plurality of control fields. Each of the plurality of control fields corresponds to one of the plurality of unshared lower order target portions. The BTB receives a current fetch group address from the processor, the current fetch group address corresponding to a current fetch group having a plurality of instructions and, in response to the current fetch group address resulting in a group hit in the BTB, provides to the processor a branch target address corresponding to a branch instruction within the plurality of instructions of the current fetch group which is indicated by a control field as valid. The control field corresponds to the branch instruction and is located within an entry of the BTB which caused the group hit. The BTB generates the branch target address using an unshared lower order target portion, corresponding to the branch instruction and located within the entry of the BTB which caused the group hit, and one of a shared higher order target portion located within the entry of the BTB which caused the group hit or a higher order portion of the current fetch group address based on a value of the control field. In another form when the value of the control field indicates the branch instruction is a short branch, the BTB generates the branch target address using the unshared lower order target portion, corresponding to the branch instruction and located within the entry of the BTB which caused the group hit, and the higher order portion of the current fetch group address. In another form when the value of the control field indicates the branch instruction is a long branch whose target is located on a different memory page than a current memory page addressed by the current fetch group address, the BTB generates the branch target address using the unshared lower order target portion, corresponding to the branch instruction and located within the entry of the BTB which caused the group hit, and the shared higher order target portion located within the entry of the BTB which caused the hit. In another form when the value of the control field indicates the branch instruction is a long branch, the BTB further uses at least a portion of the control field as a portion of the branch target address. In another form a target of the long branch is located at least two memory pages away from the current memory page addressed by the current fetch group address. In another form when the value of the control field indicates the branch instruction is a medium branch whose target is located on a memory page that is located either immediately subsequent to or immediately prior to a current memory page addressed by the current fetch group address, the BTB generates the branch target address using the unshared lower order target portion, corresponding to the branch instruction and located within the entry of the BTB which caused the group hit, and the higher order portion of the current fetch group address. In this form the BTB adds or subtracts a predetermined value to or from the higher order portion of the current fetch group address when generating the branch target address.

What is claimed is:

1. A data processing system comprising:
   a processor for generating fetch group addresses and for receiving multiple instructions in response to each fetch group address; and
   a branch target buffer (BTB) coupled to the processor, the BTB comprising a plurality of entries, each entry corresponding to a fetch group and comprising a shared higher order target portion, a plurality of unshared lower order target portions, and a plurality of control fields, each of the plurality of control fields corresponding to one of the plurality of unshared lower order target portions, the BTB for receiving a current fetch group address from the processor, the current fetch group address corresponding to a current fetch group comprising a plurality of instructions and, in response to the current fetch group address resulting in a group hit in the BTB, providing to the processor a branch target address corresponding to a branch instruction within the plurality of instructions of the current fetch group which is indicated by a control field as valid, the control field corresponding to the branch instruction and located within an entry of the BTB which caused the group hit, the BTB generating the branch target address using an unshared lower order target portion, corresponding to the branch instruction and located within the entry of the BTB which caused the group hit, and one of a shared higher order target portion located within the entry of the BTB which caused the group hit or a higher order portion of the current fetch group address based on a value of the control field, wherein:
      when the value of the control field indicates the branch instruction is a long branch, the BTB generates the branch target address using the unshared lower order target portion, corresponding to the branch instruction and located within the entry of the BTB which caused the group hit, and the shared higher order target portion located within the entry of the BTB which caused the group hit; and the BTB further uses at least a portion of the control field as a portion of the branch target address; and
      a target of the long branch is located at least two memory pages away from a current memory page addressed by the current fetch group address.

2. The data processing system of claim 1, wherein a target of the long branch is located on a different memory page than a current memory page addressed by the current fetch group address.

3. A data processing system comprising:
   a processor for generating fetch group addresses and for receiving multiple instructions in response to each fetch group address; and
   a branch target buffer (BTB) coupled to the processor, the BTB comprising a plurality of entries, each entry corresponding to a fetch group and comprising a shared higher order target portion, a plurality of unshared lower order target portions, and a plurality of control fields, each of the plurality of control fields corresponding to one of the plurality of unshared lower order target portions, the BTB for receiving a current fetch group address from the processor, the current fetch group address corresponding to a current fetch group comprising a plurality of instructions and, in response to the current fetch group address resulting in a group hit in the BTB, providing to the processor a branch target address corresponding to a branch instruction within the plurality of instructions of the current fetch group which is indicated by a control field as valid, the control field corresponding to the branch instruction and located within an entry of the BTB which caused the group hit, the BTB generating the branch target address using an unshared lower order target portion, corresponding to the branch instruction and located within the entry of the BTB which caused the group hit, and one of a shared higher order target portion located within the entry of the BTB which caused the group hit or a higher order portion of the current fetch group address based on a value of the control field, wherein when the value of the control field indicates the branch instruction is a medium branch whose target is located on a memory page that is located either immediately subsequent to or immediately prior to a current memory page addressed by the current fetch group address, the BTB generates the branch target address using the unshared lower order target portion, corresponding to the branch instruction and located within the entry of the BTB which caused the group hit, and the higher order portion of the current fetch group address, wherein the BTB modifies the higher order portion of the current fetch group address when generating the branch target address.

4. The data processing system of claim 3, wherein, when generating the branch target address, the BTB modifies the higher order portion of the current fetch group address by adding or subtracting a predetermined value to or from the higher order portion of the current fetch group address.

5. A method, comprising:
   providing a processor for generating fetch group addresses and for receiving multiple instructions in response to each fetch group address; and
   providing a branch target buffer (BTB) coupled to the processor, the BTB comprising a plurality of entries, each entry corresponding to a fetch group and comprising a shared higher order target portion, a plurality of unshared lower order target portions, and a plurality of control fields, each of the plurality of control fields corresponding to one of the plurality of unshared lower order target portions, the BTB for receiving a current fetch group address from the processor, the current fetch group address corresponding to a current fetch group comprising a plurality of instructions and, in response to the current fetch group address resulting in a group hit in the BTB, providing to the processor a branch target address corresponding to a branch instruction within the plurality of instructions of the current fetch group which is indicated by a control field as valid, the control field corresponding to the branch instruction and located within an entry of the BTB which caused the group hit, the BTB generating the branch target address using an unshared lower order target portion, corresponding to the branch instruction and located within the entry of the BTB which caused the group hit, and one of a shared higher order target portion located within the entry of the BTB which caused the group hit or a higher order portion of the current fetch group address based on a value of the control field, wherein:
      when the value of the control field indicates the branch instruction is a long branch whose target is located on a different memory page than a current memory page addressed by the current fetch group address, the BTB generates the branch target address using the unshared lower order target portion, corresponding to the branch instruction and located within the entry of the BTB which caused the group hit, and the shared higher order target portion located within the entry of the BTB which caused the group hit; and a target of the long branch is located at least two memory pages away from the current memory page addressed by the current fetch group address.

* * * * *